United States Patent Office 3,816,589
Patented June 11, 1974

---

3,816,589
PROCESS FOR RECOVERY OF VANADIUM VALUES FROM FERROPHOSPHORUS AND/OR FERROPHOSPHORUS MIXTURES
Joseph S. Fox, Lewiston, N.Y., David O. Skiles, Grand Junction, Colo., and Calvin G. Richardson, Malvern Park, Ark., assignors to Union Carbide Corporation, New York, N.Y.
No Drawing. Continuation-in-part of abandoned application Ser. No. 124,484, Mar. 15, 1971. This application Apr. 4, 1973, Ser. No. 347,684
Int. Cl. C01g 31/00
U.S. Cl. 423—68         13 Claims

ABSTRACT OF THE DISCLOSURE

A vanadium extraction process comprising the roasting of a mixture of preoxidized ferrophosphorus with or without a vanadium-containing ore, an alkaline earth material and an alkaline metal salt. The calcined mixture is then leached in an aqueous solution and the leach liquor so formed is thereafter filtrated to extract the vanadium values therein.

---

This application is a continuation-in-part of U.S. Ser. No. 124,484, filed Mar. 15, 1971, now abandoned.

FIELD OF THE INVENTION

This invention relates to a roasting-leaching process for extracting vanadium values from ferrophosphorus and/or ferrophosphorus mixtures using preoxidized ferrophosphorus an alkaline earth material and an alkaline metal salt.

DESCRIPTION OF PRIOR ART

Numerous efforts have been made to extract vanadium values from raw material containing the same but because of the complexity of the processes involved, no completely satisfactory process has been developed. In addition to the vanadium values present in raw materials such as phosphate rock located throughout a number of western and southern states, a relatively sizable amount of vanadium is contained in ferrophosphorus, which is produced as a by-product in the manufacture of elemental phosphorus. One approach for recovering vanadium values from vanadium-containing ferrophosphorus consists in the fusion of ferrophosphorus in the presence of excess oxygen and an alkali metal halide. The vanadium is then extracted by a conventional leaching technique using an aqueous solvent. Another approach employed to recovering vanadium from iron-base alloys is to charge a mixture of ferrophosphorus, iron oxide and silicon into an electric furnace to form a molten alloy and a vanadium-containing slag. The slag so formed is then mixed with an alkali halide and thereafter conventionally roasted to recover the vanadium.

Although these processes have resulted in the recovery of vanadium to some extent from vanadium-containing ferrophosphorus, they entail the use of complex process steps and/or expensive operating equipment. The present invention is directed to the substantial recovery of vanadium values contained in ferrophosphorus and/or ferrophosphorus mixed with other vanadium-containing ores by a process admirably suited for commercial application.

SUMMARY OF THE INVENTION

This invention relates to a roasting-leaching process for recovering vanadium values from ferrophosphorus and/or ferrophosphorus mixed with other vanadium-containing materials. The process basically consists of a two stage oxidation of ferrophosphorous; the first stage involves heating particulated ferrophosphorous in air at a temperature in the range of about 600–750° C. for about 15 minutes to two hours. A suitable sizing for the particulated ferrophosphorous in the first stage is about —20 to ×150 mesh. In the second stage the partially oxidized ferrophosphorous is heated in air in the range of about 800–900° C. for about ½ hour to 5 hours. In the second stage the partially oxidized ferrophosphorous can be particulated to —50 to +270 mesh. The thus preoxidized ferrophosphorus is mixed with an alkaline earth containing material and an alkaline metal salt and the mixture roasted. The roasted mixture is then subjected to a leaching process using an aqueous solvent to dissolve the vanadium values therein whereupon the leach liquor can then be appropriately filtered to recover at least 85% of the vanadium values contained in the original oxidized ferrophosphorus.

One possible procedure for oxidizing ferrophosphorus is to first pulverize the ferrophosphorus by any conventional technique to produce a particulated form. The particulated ferrophosphorus can then be subjected to an oxidizable environment for time periods and temperatures as described above sufficient to substantially convert the phosphorus to the phosphate compound. Any oxidants can be employed for this purpose including such methods as hearth oxidation, fluid-bed oxidation, rotary-kiln oxidation, flame oxidation and the like.

The substantially oxidized ferrophosphorus is then mixed with at least one alkaline earth containing material, such as calcium carbonate ($CaCO_3$), calcium oxide ($CaO$), magnesium carbonate ($MgCO_3$), magnesium oxide ($MgO$), alkaline earth-containing slags, alkaline earth-containing ores, or the like and at least one alkaline metal salt, such as sodium chloride ($NaCl$), potassium chloride ($KCl$), sodium carbonate ($Na_2CO_3$), sodium sulfate ($Na_2SO_4$) or the like, preferably sodium chloride. The exact mole ratio of the alkaline earth material, such as $CaCO_3$, to phosphorus in the oxidized ferrophosphorus is somewhat critical and should be between about 1.0 and about 2.0, preferably about 1.5. This is required to substantially insure the following reaction:

$$3CaCO_3 + 2FePO_4 \rightarrow Ca_3(PO_4)_2 + Fe_2(CO_3)_3$$

The amount of the alkaline metal salt, such as NaCl, which is to be added to the mixture of preoxidized ferrophosphorus plus the alkaline earth containing material is variable although a percentage between about 3 and about 35 based on the weight of the mixture is suitable, and between about 10 and about 25 is preferable.

The temperature and time period for the roasting cycle are variable being between about 700° C. and about 1050° C. for a resident time of at least 45 minutes. A temperature of between about 850° C. and about 950° C. held for a time period of about 1 hour or more is desirable for the roasting cycle while a temperature about 875° C. for a time period of between about 1 and about 2 hours is preferable. During the roasting cycle the vanadium in the ferrophosphorus is believed to be converted to sodium vanadate thereby making the vanadium values amenable to dissolution in a liquid medium.

The aqueous solvent required for the leaching stage should be of sufficient quantity to dissolve the vanadium values in the roasted mixture whereupon the aqueous leach liquor can then be filtered by conventional techniques to separate the vanadium values therein.

The preferred method for implementing this invention is to initially pulverize ferrophosphorus into a particulated form and then oxidizing it with a sufficient amount of an oxidant to convert the phosphorus therein the phosphate state. The oxidized ferrophosphorus thereafter is mixed with an alkaline earth material in a mole ratio with the phosphorus in the oxidized ferrophosphorus of about 1.5. For example, when CaO is used as the alkaline

earth material, a 1.5 ratio will be sufficient to substantially satisfy the following reaction:

$$3CaO + 2FePO_4 \rightarrow Fe_2O_3 + Ca_3(PO_4)_2$$

An alkaline metal salt, such as NaCl, is then added to the mixture of the oxidized ferrophosphorus and alkaline earth additive, in an amount equal to about 25% of the weight of the mixture. The composite so formed is intermixed with water, compacted into predesired shapes and then subjected to a roasting process wherein it is heated to a temperature of about 875° C. and held thereat for a time period of about 2 hours. During the roasting period the vanadium present in the mixture is believed to be converted into sodium vanadate so that when the mixture is leached in an aqueous solution, the vanadium values therein will substantially dissolve. The leach liquor is then filtered by any conventional technique to separate the vanadium values therein. This roasting and leaching process will result in the extraction of at least 85% of the vanadium values therein. This roasting and leaching phorus.

It is also within the purview of this invention to add oxidized ferrophosphorus to other vanadium-containing ores and then process the mixture according to the above procedure to extract the vanadium values therein.

EXAMPLE 1

A sample of ferrophosphorus was obtained from an electric furnace smelting process wherein phosphate rock was charged to produce elemental phosphorus. The ferrophosphorus, a by-product of the above process, was pulverized to 100 Tyler mesh size and finer and then analyzed by chemical and spectrographic analyses which revealed a $V_2O_5$ content of 8.86%, a P content of 25.4% and a Fe content of 57.2%.

A ⅛ inch thick layer of the particulated ferrophosphorus was spread on a silica dish and then placed in a muffle furnace. The temperature in the furnace was raised to 700° C. and held thereat for 3 hours while wet air flowed over the bed. The ferrophosphorus was thereafter removed and upon being cooled to ambient it was weighed and found to have gained 5% in weight. The ferrophosphorus was again pulverized and spread on a silica tray and this time heated overnight at an elevated temperature of 825° C. Again wet air was forced to flow over the bed. Upon removal from the furnace and cooling to ambient, the ferrophosphorus was weighed and found to have gained 63% in weight, such gain being attributed to the oxidation of the ferrophosphorus which was present predominantly as $FePO_4$ based on an X-ray study. Thus every gram of unoxidized FeP produced about 1.63 grams of oxidized FeP based on the above weight increase. An analysis of the oxidized ferrophosphorus showed it to contain 5.4% $V_2O_5$ and 15.6% P.

A sample of ore, obtained from a composite of core drillings from an Arkansas vanadium mine in Hot Springs, Arkansas, was pulverized, blended and then upon being chemically and spectrographically analyzed, found to contain 1.11% of $V_2O_5$.

Various mixtures of the oxidized and/or unoxidized ferrophosphorus, the Arkansas ore, $CaCO_3$, NaCl and water were blended and fed into a 1-inch diameter cylindrical mold. A pressure of 1000 pounds was applied on a 2.5-inch diameter ram which in turn compressed a 1-inch ram in the mold to produce 1-inch diameter by 3-inch length wet compacts. Each compact was thereupon placed in an alundum combustion boat and the assembly inserted in a muffle furnace set at 875° C. with a wet air over bed. After a residence time of 2 hours in the furnace, the calcined compact was removed, cooled to ambient and then crushed to 50 Tyler mesh size and finer. The pulverized material so formed was leached in boiling water for one hour after which the leach liquor was filtered. The residue and the filtrate so obtained was chemically analyzed for $V_2O_5$ and from this analysis the percent of $V_2O_5$ extraction was calculated.

Following the procedure outlined above, six tests were conducted on mixtures having various proportions of the additives listed above. Tests 5 and 6 were performed without the addition of pre-oxidized FeP and test 1 was performed without the addition of $CaCO_3$. The result of all the tests are shown in Table 1 and by comparing the percent of $V_2O_5$ extracted from each test sample, we see that the extractions according to the process of this invention are substantially higher than that of the prior art.

TABLE 1

[Water-soluble vanadium from a NaCl roast of Arkansas ore and ferrophosphorus (reagent $CaCO_3$ when used)]

| Item No. | Description of item | Test No. 1 | 2 | 3 | 4 | 5 | 6 |
|---|---|---|---|---|---|---|---|
| 1 | Grams of Arkansas ore in sample | 60 | 60 | 60 | 60 | 60 | 60 |
| 2 | Grams of oxidized FeP in sample | 9.8 | 9.8 | 9.8 | 9.8 | 0 | 0 |
| 3 | Grams of unoxidized FeP in sample | 0 | 0 | 0 | 0 | 6.0 | 6.0 |
| 4 | Grams of reagent $CaCO_3$ | 0 | 2.6 | 7.2 | 10.2 | 0 | 7.0 |
| 5 | Percent oxidized FeP = $\frac{\text{Item 2}}{\text{Item 1}} \times 100$ | 16.3 | 16.3 | 16.3 | 16.3 | 0 | 0 |
| 6 | Percent unoxidized FeP = $\frac{\text{Item 3}}{\text{Item 1}} \times 100$ | 0 | 0 | 0 | 0 | 10 | 10 |
| 7 | Percent $CaCO_3$ added = $\frac{\text{Item 4}}{\text{Item 1}} \times 100$ | 0 | 4.3 | 12 | 17 | 0 | 12 |
| 8 | Mole ratio of ($CaCO_3$/P) = $\frac{\text{Moles of } CaCO_3 \text{ in Item 4}}{\text{Moles of P in FeP sample}}$ | 0 | 0.53 | 1.5 | 2.1 | 0 | 1.5 |
| 9 | Grams of NaCl added | 17.2 | 18.3 | 19.3 | 20.0 | 16.5 | 18.3 |
| 10 | Percent NaCl added = $\frac{(\text{Item 9})}{(\text{Item 1}+\text{Item 2}+\text{Item 4})} \times 100$ | 25 | 25 | 25 | 25 | | |
| 11 | Percent NaCl added = $\frac{(\text{Item 9})}{(\text{Item 1}+\text{Item 3}+\text{Item 4})} \times 100$ | | | | | 25 | 25 |
| 12 | Percent $V_2O_5$ in sample = $\frac{(\text{g. } V_2O_5 \text{ in Item 1}+\text{Item 2})}{(\text{Wts. of Item 1}+\text{Item 2}+\text{Item 4})} \times 100$ | 1.72 | 1.66 | 15.6 | 1.50 | | |
| 13 | Percent $V_2O_5$ in sample = $\frac{(\text{g. } V_2O_5 \text{ in Item 1}+\text{Item 3})}{(\text{Wts. of Item 1}+\text{Item 3}+\text{Item 4})} \times 100$ | | | | | 1.82 | 1.64 |
| 14 | Percent $V_2O_5$ extracted | 60 | 69 | 88 | 81 | 16 | 26 |
| 15 | Percent $V_2O_5$ in tailings of leached residue | 0.73 | 0.55 | 0.21 | 0.32 | | 1.28 |

EXAMPLE II

A second series of tests were conducted following the procedure outlined above and using the same Arkansas Ore and ferrophosphorus as prepared in Example I. The only deviation in this series of tests was the substitution of CaO for $CaCO_3$ as the alkaline earth compound. Again several tests were performed without the oxidized ferrophosphorus additive. The results of this series of tests are shown in Table 2 and from an evaluation of the percent of $V_2O_5$ extracted from each test sample we see that the extraction according to the process of this invention is substantially higher than that of the prior art. In addition, large amounts of oxidized ferrophosphorus can be added to vanadium-containing ores without decreasing the percent extraction of vanadium while increasing the amount of unoxidized ferrophosphorus to a vanadium-containing ore will substantially decrease the percent extraction of vanadium.

These tests also show that the best extraction of 89% $V_2O_5$ was obtained with a mole ratio of CaO to phosphorus of 1.5 which satisfies the reaction $$3CaO + 2FePO_4 \rightarrow Ca_3(PO_4)_2 + Fe_2O_3.$$

pacts were subjected to a roast-leach process as described in Example 1. The percent of $V_2O_5$ extracted from these tests varied from 84% to 87% as shown in Table 3. These tests show that a high extraction of vanadium is possible using $MgCO_3$ or MgO as the alkaline earth compound in the process of this invention.

TABLE 3
[Water-soluble vanadium from NaCl roast of Arkansas ore, ferrophosphorus and MgO or $MgCO_3$]

| Test No. | Alkaline additive Name | Mole/mole P | Percent $V_2O_5$ Extracted | In residue |
|---|---|---|---|---|
| 1 | $MgCO_3$ | 1.1 | 86 | 0.30 |
| 2 | $MgCO_3$ | 1.5 | 87 | 0.28 |
| 3 | $MgCO_3$ | 1.9 | 85 | 0.32 |
| 4 | MgO | 1.1 | 86 | 0.32 |
| 5 | MgO | 1.5 | 87 | 0.29 |
| 6 | MgO | 1.9 | 84 | 0.35 |

EXAMPLE IV 1-inch diameter wet compacts were prepared as described in Example I using various proportions of oxidized ferrophosphorus with Arkansas ore, a 1.5 mole ratio of CaCO per mole of phosphorus in the oxidized

TABLE 2
[Water-soluble vanadium from a NaCl roast of Arkansas ore, ferrophosphorus and CaO]

| Item No. | Description | Test No. 1 | 2 | 3 | 4 | 5 | 6 | 7 | 8 | 9 |
|---|---|---|---|---|---|---|---|---|---|---|
| 1 | Grams of Arkansas ore in sample | 50 | 50 | 50 | 50 | 50 | 50 | 40 | 40 | 40 |
| 2 | Grams of oxidized FeP in samlpe | 8.2 | 8.2 | 8.2 | 16.4 | 16.4 | 16.4 | 0 | 0 | 0 |
| 3 | Grams of unoxidized FeP in sample | | | | | | | 2.0 | 4.0 | 6.0 |
| 4 | Grams of CaO | 2.6 | 3.4 | 4.3 | 5.2 | 6.9 | 8.6 | 1.34 | 2.7 | 4.0 |
| 5 | Percent oxidized FeP = 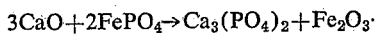 ×100 | 16.4 | 16.4 | 16.4 | 32.8 | 32.8 | 32.8 | | | |
| 6 | Percent unoxidized FeP = $\frac{\text{Item 3}}{\text{Item 1}}$ ×100 | 0 | 0 | 0 | 0 | 0 | 0 | 5 | 10 | 15 |
| 7 | Mole ratio CaO/P = $\frac{\text{Moles of CaO in Item 4}}{\text{Moles of P in FeP Sample}}$ | 1.1 | 1.5 | 1.9 | 1.1 | 1.5 | 1.9 | 1.5 | 1.5 | 1.5 |
| 8 | Grams of NaCl added | 15.2 | 15.4 | 15.6 | 17.9 | 18.3 | 18.8 | 10.8 | 11.6 | 12.5 |
| 9 | Percent NaCl added = $\frac{\text{(Item 8)}}{\text{(Item 1 + Item 2 + Item 4)}}$ 100 | 25 | 25 | 25 | 25 | 25 | 25 | | | |
| 10 | Percent NaCl added = $\frac{\text{(Item 8)}}{\text{(Item 1 + Item 3 + Item 4)}}$ 100 | | | | | | | 25 | 25 | 25 |
| 11 | Percent $V_2O_5$ in sample = $\frac{\text{(g. }V_2O_5\text{ in Item 1 + g. }V_2O_5\text{ in Item 2)}}{\text{(g. of Item 1 + g. of Item 2 + Item 4)}}$ 100 | 1.64 | 1.62 | 1.59 | 2.02 | 1.98 | 1.94 | | | |
| 12 | Percent $V_2O_5$ in sample = $\frac{\text{(g. }V_2O_5\text{ in Item 1 + g. }V_2O_5\text{ in Item 3)}}{\text{(g. of Item 1 + g. of Item 3 + Item 4)}}$ 100 | | | | | | | 1.43 | 1.71 | 1.95 |
| 13 | Percent $V_2O_5$ extracted | 85 | 89 | 89 | 87 | 89 | 85 | 78 | 77 | 29 |
| 14 | Percent $V_2O_5$ in tailings of leached residue | 0.26 | 0.20 | 0.20 | 0.29 | 0.24 | 0.32 | 0.33 | 0.40 | 0.49 |

EXAMPLE III

A series of NaCl roast tests were performed as described in Example 1 except that $MgCO_3$ or MgO was used as the alkaline earth compound instead of $CaCO_3$. Using the same Arkansas ore and oxidized ferrophosphorus as prepared in Example I and mixed with a ratio of 32.5 grams of oxidized ferrophosphorus to every 100 grams of Arkansas ore, 1 inch diameter wet compacts were prepared. Also included in the wet compacts were various mole ratios of $MgCO_3$ to P or MgO to P and 25% by weight NaCl as based on the total weight of ore, oxidized ferrophosphorus and either $MgCO_3$ or MgO. These compacts were subjected to a roast-leach process as described in Example 1. The percent of $V_2O_5$ extracted from these ferrophosphorus and 25% by weight of NaCl based on the total weight of the additives listed. The compacts were then subjected to the roast-leach process outlined in Example I and followed thereafter by chemical analysis to determine the amount of $V_2O_5$ extracted. The results of the analysis are tabulated in Table 4 and show extractions of 89% $V_2O_5$ from oxidized ferrophosphorus without Arkansas ore and extractions of 90% to 92% $V_2O_5$ from Arkansas ore containing ferrophosphorus in amounts from 20% to 80% based on the weight of the ore and ferrophosphorus used. This demonstrates that the vanadium grade of the charge to a kiln can be increased significantly without impairing the vanadium extraction.

TABLE 4

[Water-soluble vanadium resulting from NaCl roast of Arkansas ore and/or ferrophosphorus plus CaCO₃]

| Item No. | Description of item | Test No. 1 | 2 | 3 | 4 | 5 | 6 |
|---|---|---|---|---|---|---|---|
| 1 | Gram of Arkansas ore in sample | 50 | 50 | 40 | 20 | 10 | 0 |
| 2 | Gram of oxidized FeP in sample | 12.2 | 16.3 | 26.1 | 32.6 | 48.9 | 40 |
| 3 | Gram of reagent CaCO₃ in sample | 9.1 | 12.2 | 19.6 | 24.5 | 36.7 | 30 |
| 4 | Percent oxidized FeP = $\frac{(\text{Item 2})}{(\text{Item 1} + \text{Item 2})} \cdot 100$ | 19.6 | 24.5 | 39.5 | 62.0 | 83.0 | 100 |
| 5 | Percent V₂O₅ in sample = $\frac{(\text{Gram V}_2\text{O}_5 \text{ in Item 1} + \text{Item 2})}{(\text{Wt. of Item 1} + \text{Item 2} + \text{Item 3})} \cdot 100$ | 1.70 | 1.84 | 2.18 | 2.59 | 2.91 | 3.12 |
| 6 | Percent V₂O₅ in tailings of leached residue | 0.18 | 0.20 | 0.26 | 0.27 | 0.34 | 0.44 |
| 7 | Percent V₂O₅ extracted = $100 - \frac{(\text{g. V}_2\text{O}_5 \text{ in residue} \times 100)}{(\text{g. V}_2\text{O}_5 \text{ in sample})}$ | 91 | 91 | 90 | 92 | 91 | 89 |

EXAMPLE V 1-inch diameter wet compacts, prepared as described in Example I from 32.5 grams of oxidized ferrophosphorus per 100 grams of Arkansas ore, 1.5 moles of CaCO₃ per mole of P in the oxidized ferrophosphorus, and 25% by weight of NaCl based on the weight of the ore, oxidized ferrophosphorus and CaCO₃, were subjected to a roast-leach process as outlined in Example I. The roast temperature was varied from 725° C. to 1025° C. for several samples while the residual time was held constant at 2 hours. The percent of V₂O₅ extracted from the compacts for the different roasting temperatures is tabulated in Table 5 and shows that maximum vanadium recovery was had at about 875° C.

TABLE 5

[Effect of temperature on NaCl roast of Arkansas ore mixed with oxidized ferrophosphorus plus CaCO₃]

| Test No. | Roast temp. (° C.) | Percent V₂O₅ Extraction | In residue |
|---|---|---|---|
| 1 | 725 | 57 | 0.89 |
| 2 | 800 | 85 | 0.32 |
| 3 | 875 | 91 | 0.20 |
| 4 | 950 | 80 | 0.43 |
| 5 | 1,025 | 55 | 0.93 |

EXAMPLE VI 1-inch diameter wet compacts, prepared as in Example I from oxidized ferrophosphorus, 1.5 moles of CaCO₃ per mole of P in the oxidized ferrophosphorus and various percentages of NaCl based on the weight of the ferrophosphorus and the CaCO₃, were subjected to a roast-leach process as described in Example I. The effect of the NaCl additive on the V₂O₅ extraction is shown in Table 6. The results obtained demonstrate that excellent extractions can be had with a 25% by weight NaCl addition. Higher amounts of NaCl probably will not reduce the extraction of vanadium but will lower the vanadium throughput in the roasting step.

TABLE 6

[Effect of amount of NaCl on roast of oxidized ferrophosphorus plus CaCO₃]

| Test No. | Percent NaCl added | Percent V₂O₅ Extraction | In residue |
|---|---|---|---|
| 1 | 8 | 80 | 0.78 |
| 2 | 15 | 82 | 0.71 |
| 3 | 25 | 89 | 0.44 |

EXAMPLE VII 1-inch diameter wet compacts, prepared as in Example V except that oxidized ferrophosphorus was used without the Arkansas ore, were subjected to a roast-leach process as outlined in Example I. The roast temperature was varied from 725° C. to 1025° C. for several samples while the residence time was held constant at 2 hours. The V₂O₅ recovery as a function of roasting temperature is shown in Table 7. Again maximum recovery of V₂O₅ was obtained at 875° C.

TABLE 7

[Effect of temperature on NaCl roast of oxidized ferrophos plus CaCO₃]

| Test No. | Roast temp. (° C.) | Percent V₂O₅ Extraction | In residue |
|---|---|---|---|
| 1 | 725 | 17 | 3.3 |
| 2 | 800 | 38 | 2.35 |
| 3 | 875 | 89 | 0.44 |
| 4 | 950 | 73 | 1.06 |
| 5 | 1,025 | 77 | 0.89 |

EXAMPLE VIII 1-inch diameter wet compacts were prepared as in Example V except that the NaCl additive was varied from 8% to 25% by weight based on the combined weight of the ferrophosphorus, Arkansas ore and CaCO₃. The compacts were then subjected to a roast-leach process as outlined in Example I. The results obtained are shown in Table 8 and demonstrate that excellent extractions can be had with a 25% by weight NaCl addition. Higher amounts of NaCl probably will not reduce the extraction of vanadium but will lower the vanadium throughput in the roasting step.

TABLE 8

[Effects of amount of NaCl on roast of Arkansas ore, oxidized ferrophosphorus plus CaCO₃]

| Test No. | Percent NaCl added | Percent V₂O₅ Extraction | In residue |
|---|---|---|---|
| 1 | 8 | 77 | 0.49 |
| 2 | 15 | 79 | 0.43 |
| 3 | 25 | 91 | 0.20 |

EXAMPLE IX

Slag obtained from an open hearth furnace in Chile was chemically analyzed and found to contain 5.85% V₂O₅, 1.38% P, 19.6% CaO, 5.7% MgO, 30.7% Fe and various other impurities. Ferrophosphorus, upon being chemically analyzed, was found to contain 23.8% P, 5.3% O₂ and 6.53% V₂O₅ while oxidized ferrophosphorus was found to contain 16.2% P, 34.3% O₂ and 4.33% V₂O₅.

1-inch diameter wet compacts were prepared as in Example I using various mixtures of Arkansas Ore (1.58% V₂O₅), Chile slag, unoxidized or oxidized ferrophosphorus, and 25% by weight sodium chloride based on the total mix additions of ore, slag and ferrophosphorus. The compacts were then subjected to a roast-leach process as outlined in Example I. The results obtained are shown in Table 9 which demonstrates that by using oxidized ferrophosphorus, a large quantity of both slag (greater than 40%) and ferrophosphorus (greater than 12%) can be added to a vanadium-containing ore while maintaining excellent V₂O₅ recovery. Thus, an alkaline earth metal-containing slag can be used in this inventive process in place of an alkaline earth compound.

a temperature of about 800–900° C. further heating the particulated partially oxidized ferrophosphorus

TABLE 9

[Recovery of vanadium by NaCl roast of mixtures of Arkansas ore, Chile slag and FeP]

| Test No. | Ore, grams | FeP in charge | | | Chile slag in charge | | | | Percent $V_2O_5$ | |
|---|---|---|---|---|---|---|---|---|---|---|
| | | Grams | Percent FeP (based on ore) | | Grams | Wt. ratio slag/FeP | Percent Chile slag (based on ore wt.) | Moles CaO and MgO/P in FeP+slag | Extraction | In tails |
| 1 | 25 | 0.75 | 3.0 | | 1.50 | 2.0 | 6.0 | 1.14 | 87.4 | 0.28 |
| 2 | 25 | 0.75 | 3.0 | | 1.88 | 2.5 | 7.5 | 1.41 | 88.1 | 0.26 |
| 3 | 25 | 0.75 | 3.0 | | 2.25 | 3.0 | 9.0 | 1.63 | 87.0 | 0.29 |
| 4 | 25 | 0.75 | 3.0 | | 2.63 | 3.5 | 10.5 | 1.87 | 87.0 | 0.30 |
| 5 | 25 | 0.75 | 3.0 | | 4.50 | 6.0 | 18.0 | 2.86 | 85.9 | 0.36 |
| 6 | 25 | 0.75 | 3.0 | | 6.25 | 8.3 | 25.0 | 3.60 | 83.0 | 0.47 |
| 7 | 25 | 0.75 | 3.0 | | 8.00 | 10.7 | 32.0 | 4.22 | 78.6 | 0.62 |
| 8 | 25 | 0.75 | 3.0 | | 10.00 | 13.3 | 40.0 | 4.81 | 73.5 | 0.81 |
| 9 | 25 | 1.50 | 6.0 | | 3.00 | 2.0 | 12 | 1.14 | 89.3 | 0.26 |
| 10 | 25 | 1.50 | 6.0 | | 3.75 | 2.5 | 15 | 1.41 | 89.1 | 0.28 |
| 11 | 25 | 1.50 | 6.0 | | 4.50 | 3.0 | 18 | 1.63 | 87.6 | 0.32 |
| 12 | 25 | 1.50 | 6.0 | | 5.25 | 3.5 | 21 | 1.87 | 88.2 | 0.32 |
| 13 | 25 | 1.50 | 6.0 | | 7.00 | 4.7 | 28 | 2.35 | 85.6 | 0.41 |
| 14 | 25 | 1.50 | 6.0 | | 8.80 | 5.9 | 35 | 2.81 | 83.2 | 0.51 |
| 15 | 25 | 1.50 | 6.0 | | 10.5 | 7.0 | 42 | 3.18 | 70.0 | 0.94 |
| 16 | 25 | 1.50 | 6.0 | | 12.5 | 8.3 | 50 | 3.59 | 59.7 | 1.30 |
| 17 | 25 | 2.50 | 10.0 | | 5.00 | 2.0 | 20 | 1.14 | 80.3 | 0.54 |
| 18 | 25 | 2.50 | 10.0 | | 6.25 | 2.5 | 25 | 1.41 | 5.6 | 2.36 |
| 19 | 25 | 2.50 | 10.0 | | 7.50 | 2.0 | 30 | 1.63 | 2.7 | 2.66 |
| 20 | 25 | 2.50 | 10.0 | | 8.75 | 3.5 | 35 | 1.87 | 1.2 | 2.72 |
| 21 | 25 | 5.0 | 20 | | 10.0 | 2.0 | 40 | 1.14 | 0.0 | |
| 22 | 25 | 5.0 | 20 | | 12.5 | 2.5 | 50 | 1.41 | 0.0 | |
| 23 | 25 | 5.0 | 20 | | 15.0 | 3.0 | 60 | 1.63 | 0.0 | |
| 24 | 25 | 5.0 | 20 | | 17.5 | 3.5 | 70 | 1.87 | 0.0 | |
| 25 | 25 | *5.0 | *20 | | 10.0 | 2.0 | 40 | 1.67 | 87.6 | 0.39 |
| 26 | 25 | *5.0 | *20 | | 12.5 | 2.5 | 50 | 1.94 | 83.1 | 0.56 |
| 27 | 25 | *5.0 | *20 | | 15.0 | 3.0 | 60 | 2.33 | 69.8 | 1.03 |
| 28 | 25 | *5.0 | *20 | | 17.5 | 3.5 | 70 | 2.63 | 75.5 | 0.86 |

*Oxidized.

EXAMPLE X

Two separate samples of ferrophosphorous, one in the amount of 100 grams of −48 mesh (Tyler) and the other in the same amount sized −100 mesh, were placed in silica dishes to a bed depth of about ⅛ inch. The samples were placed in an electric muffle furnace set at 700° C. and air was continuously passed oved the bed. The samples were removed after 1 hour. The gain in weight, oxidation, of each was about 5% to 8%. Further treatment at this temperature of 700° C. failed to significantly increase the amount of oxidation. The partially oxidized material was easily removed from the dishes and was slightly sintered. After pulverizing to about 100 mesh and replacing the samples in the same dishes, they were heated in the muffle furnace set at 825° C. for about 3 hours and air was continuously passed over the material as before. The resulting sample materials were over 90% oxidized with a total weight gain of 60% in each case.

EXAMPLE XI

Samples of −48 mesh and 100 mesh ferrophosphorous as described in Example X were placed directly in silica dishes in the furnace described in Example X and were heated at 825° C. for 3 hours, without any prior treatment. Air was continuously passed over the material during heating as in Example X. Both sample materials slagged and fused as a result of the heating treatment and it was not possible to remove the samples from their trays.

The above examples are not intended to limit the scope of this invention in any way and are provided primarily to show how the extraction of vanadium values from ferrophosphorus and mixtures thereof, can be increased by using the teachings of this invention.

What is claimed is:

1. A process for recovering vanadium from ferrophosphorus containing the same comprising the steps:
   (a) oxidizing particulated ferrophosphorus with an oxidant in the range of about 600–750° C. for about 15 minutes to 2 hours to partially oxidize the phosphorus therein, subjecting the partially oxidized ferrophosphorus to further particulation and thereafter at a temperature of about 800–900° C. further heating the particulated partially oxidized ferrophosphorus for about ½ hour to 5 hours to substantially convert the phosphorus therein to phosphate;
   (b) adding and mixing an alkaline earth containing material to said oxidized ferrophosphorus in a mole ratio of the alkaline material to the phosphorus in said oxidized ferrophosphorus of between about 1.0 and about 2.0;
   (c) adding and mixing an alkali metal salt in an amount between about 3% and about 35% by weight based on the weight of said mixture in step (b);
   (d) roasting said mixture at a temperature between about 700° C. and about 1050° C. for a time period of at least 45 minutes so as to substantially convert the vanadium into a soluble state;
   (e) leaching said roasted mixture of step (d) with an aqueous solution to dissolve the vanadium therein; and
   (f) separating the vanadium from the leach liquor of step (e).

2. The process of claim 1 wherein water is added to the mixture of step (c) so as to form a moist compact of all the additives.

3. The process of claim 1 wherein a particulated vanadium-containing ore is added to the oxidized ferrophosphorus in step (a).

4. The process of claim 3 wherein water is added to the mixture of step (c) so as to form a moist compact of all the additives.

5. The process of claim 2 wherein in step (b) said alkaline earth-containing material is selected from at least one of the group consisting of calcium carbonate, calcium oxide, magnesium carbonate, magnesium oxide, alkaline earth-containing slags and alkaline earth-containing ores.

6. The process of claim 4 wherein in step (b) said alkaline earth-containing material is selected from at least one of the group consisting of calcium carbonate, calcium oxide, magnesium carbonate, magnesium oxide, alkaline earth-containing slags and alkaline earth-containing ores.

7. The process of claim 2 wherein in step (c) said alkaline metal salt is selected from at least one of the group consisting of sodium chloride, potassium chloride, sodium carbonate and sodium sulfate.

8. The process of claim 4 wherein in step (c) said alkaline metal salt is selected from at least one of the group consisting of sodium chloride, potassium chloride, sodium carbonate and sodium sulfate.

9. The process of claim 5 wherein said alkaline earth-containing material is present in a mole ratio of about 1.5, and said alkaline metal salt is present in between about 10% and about 25% by weight of the oxidized ferrophosphorus and the alkaline earth-containing material.

10. The process of claim 6 wherein said alkaline earth-containing material is present in a mole ratio of about 1.5, and said alkaline metal salt is present in between about 10% and about 25% by weight of the oxidized ferrophosphorus, vanadium-containing ore and the alkaline earth-containing material.

11. The process of claim 9 wherein in step (d) said roasting is carried out at a temperature of about 875° C. for a period of between about 1 and about 2 hours.

12. The process of claim 10 wherein in step (d) said roasting is caried out at a temperature of about 875° C. for a period of between about 1 and about 2 hours.

13. The process of claim 1 wherein the oxidizing of ferrophosphorous in the temperature range of about 600–750° C. is conducted for a time sufficient to provide a weight gain of about 5–8% in said ferrophosphorous.

References Cited

UNITED STATES PATENTS

| 3,346,329 | 10/1967 | Hermann. |
|---|---|---|
| 3,332,736 | 7/1967 | Shaw et al. |
| 3,320,024 | 5/1967 | Burwell. |
| 3,486,842 | 12/1969 | Michal. |
| 1,554,917 | 9/1925 | Kunkle. |
| 2,168,169 | 8/1939 | Meyer. |
| 2,193,092 | 3/1940 | Frisk et al. |
| 1,255,144 | 2/1918 | Ekeley et al. |

HERBERT T. CARTER, Primary Examiner

U.S. Cl. X.R.

423—62